April 21, 1953 G. C. SOUTHWORTH 2,636,125

SELECTIVE ELECTROMAGNETIC WAVE SYSTEM

Filed April 10, 1948

2 SHEETS—SHEET 1

INVENTOR
G. C. SOUTHWORTH
BY E. V. Griggs
ATTORNEY

INVENTOR
G. C. SOUTHWORTH
BY E. V. Griggs
ATTORNEY

Patented Apr. 21, 1953

2,636,125

UNITED STATES PATENT OFFICE 2,636,125

SELECTIVE ELECTROMAGNETIC WAVE SYSTEM

George C. Southworth, Rumson, N. J., assignor to Bell Telephone Laboratories, Incorporated, New York, N. Y., a corporation of New York Application April 10, 1948, Serial No. 20,311

3 Claims. (Cl. 250—33.63)

This invention relates to selective electromagnetic wave systems and more particularly to selective electrical systems for waves of the submillimeter wavelength region including the longer infra-red or heat waves.

One object of the invention is to enable production of electromagnetic waves of frequencies in the submillimeter range or below the frequencies readily attainable by oscillators of conventional types.

Another object of the invention is to selectively transmit a band of electromagnetic waves in the submillimeter wavelength region while discriminating against and substantially eliminating energies of frequencies lying outside the desired band.

Another object of the invention is to separate a plurality of bands of electrical waves at wavelength ranges of the order of a millimeter or less.

An additional object of the invention is to achieve multiplex carrier wave transmission in the submillimeter wavelength range.

The invention depends upon certain principles of wave guide transmission which apply to the propagation of electromagnetic waves through guides of limited area and particularly through hollow tubes of electrically conducting material. Such tubular guides present a high-pass frequency transmission characteristic, i. e. they readily transmit waves having a frequency higher than a cut-off frequency determined by the mode of oscillation and by the transverse dimensions of the guide and they highly attenuate waves of lower than the cut-off frequency.

Tubular guides of circular contour transmit freely waves of a dominant mode having a natural wavelength which is less than approximately 1.708 times the diameter of the guide. Rectangular guides freely transmit dominant modes of transverse electric waves having a wavelength up to approximately twice the greater transverse dimension of the guide. Moreover, within the transmission frequency band of the guide, the phase velocity for a wave of a given frequency is dependent upon the transverse dimension of the guide and increases as that transverse dimension decreases.

Since the phase velocity for transmission of a wave through a tubular guide is dependent upon the dimension of the guide it is possible, by using a parallel assemblage of such guides arranged in close contiguity, to build up a structure through which the propagation velocity of a given frequency wave may be predetermined by the design of the structure. It is accordingly possible to simulate lenses, both converging and diverging, and prisms, both reflecting and refracting, as well as wave reflecting mirrors by suitably dimensioning such structures and their components.

As in the case of optical structures, lenses and prisms in wave guide structures may be fabricated by suitably dimensioning the thickness of the structure. Also, as the phase velocity may be predetermined in optical structures by the proper selection of the glass composition, so in wave guide structures the phase velocity may be predetermined by the proper design of the transverse dimensions of the individual guides. Where it may be desired to provide a structure, the phase velocity of which is non-uniform, the device may be fabricated of individual guides the transverse dimensions of which are graduated from one region of the structure to another so as to attain the desired phase velocity pattern.

In accordance with one embodiment of the invention the reflecting and refracting properties of wave guide structures are used to filter or purify a beam of electromagnetic waves for the purpose of restricting the beam to a desired frequency band. The restricted band, which is varied in accordance with desired signals at a transmitting point, is transmitted to a remote receiving point where it is picked up and detected to yield the signal. In accordance with a more complex embodiment of the invention a source of electromagnetic waves of a very wide range of frequencies is caused to yield a plurality of contiguous but non-overlapping frequency bands each of which may become the carrier for an individual channel of a multiplex system when signal modulated as is the carrier band in the first embodiment.

For the submillimeter wavelength range for which this invention is particularly adapted, although of course not limited thereto, wave guide structures of the type desired may most readily be produced by punching or drilling holes through a plate or disk. Where circular wave guide contours are satisfactory the drilling method is very readily applicable. A relatively thick disk or plate of metal transversely apertured by punching closely spaced holes may constitute an assemblage of wave guides that will readily permit transmission therethrough of electromagnetic waves of frequency higher than the cut-off frequency while effectively attenuating and substantially precluding transmission of energy of frequencies lower than the cut-off frequency. Waves of frequencies for which the apertured plate is opaque may be reflected from the face on which they are incident in accordance with the well-known laws governing reflection of electromagnetic waves. In this manner the device may serve as a high-pass transmission filter and a low-pass reflection filter.

By causing a beam from a source of infra-red rays to pass through a high-pass wave guide filter of the type described and thereafter to be reflected from a second similar high-pass filter having a slightly higher cut-off, a band, which can be made as narrow as desired, may be selected. To the extent that the beam reflected from the second filter may contain in addition to the desired band some higher frequency components reflected because of the space factor of the reflecting face, i. e., the ratio of solid face to open wave guide area, the selected band may be still further refined by additional reflection steps which permit the undesired higher frequency components to be reduced to any desired degree.

A screen or apertured disk serving as a transmission filter for very short electromagnetic waves may also serve as a refracting prism if the diameters of the apertures or holes be graduated from one margin of the disk towards the opposite margin. If the disk be provided with apertures arranged in circular rows the disk may serve as a converging lens if the holes at the center are made largest and with progressively decreasing diameters in the direction from the center outward along a radius. Similar refracting effects may be secured if the disk be made double concave or double convex so as to vary the length of the apertures from the center of the disk outwardly towards the periphery. Various effects may be had by combining the features of variation in diameter of the apertures with variation in thickness of the disk from its center.

Figure 1:
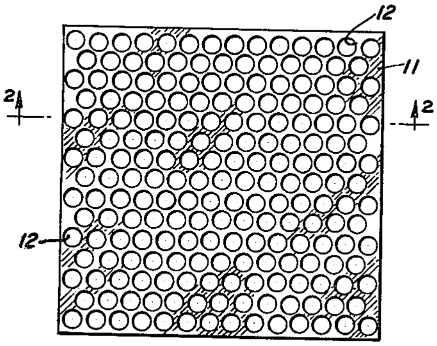
Fig. 1 is a plan view of a perforated plate embodying certain features of the invention.
Figure 7:
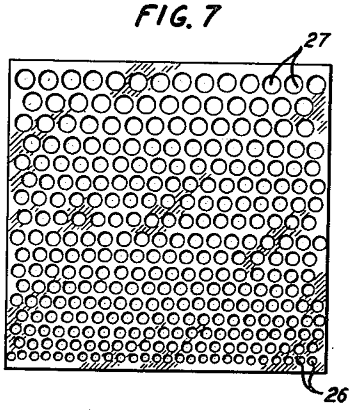
Figure 8:
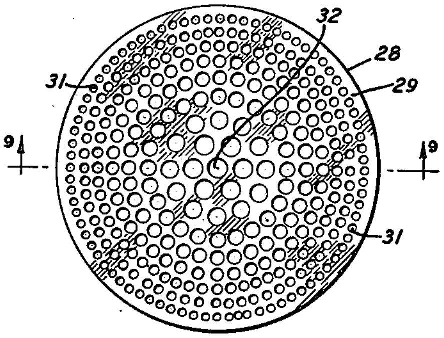
Figure 9:
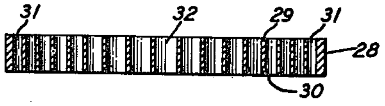
Figure 10:
Figure 11:
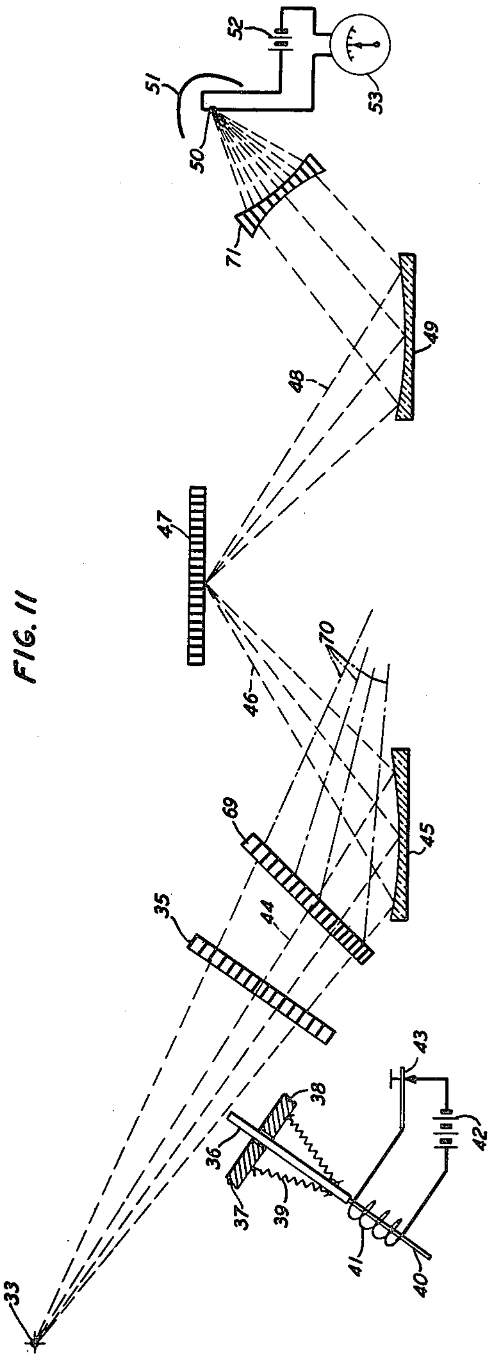
Figure 12:
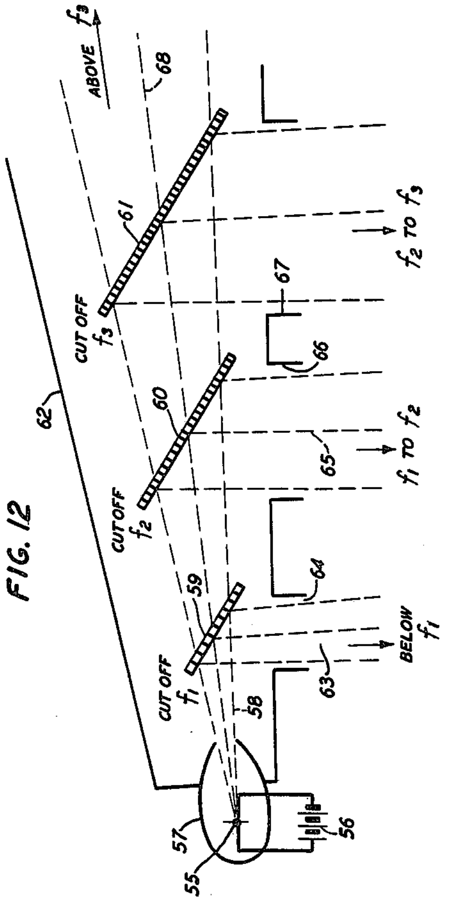

Fig. 7 presents a modification of the structure of Fig. 1 in which the apertures are graduated in size from row to row in a direction passing from one margin of the apertured plate to the opposite margin;

Fig. 8 shows a circular disk with apertures which decrease in diameter from the center towards the periphery;

Fig. 9 is a section of Fig. 8 on the line 9—9;

Fig. 10 shows a section of a modification of the structure of Fig. 9 in which the two major faces are both concave;

Fig. 11 is a schematic diagram of a carrier telegraph system embodying the invention; and Fig. 12 shows the application of the invention to the production of contiguous frequency bands of submillimeter waves.

Referring to Fig. 1 there is shown a thick sheet or plate 11 having closely spaced circular apertures 12 each of diameter $d$. The plate 11 is composed of any suitable material, such as copper, which is substantially opaque and therefore reflective for microwaves. The apertures pass entirely through the plate which has a thickness $t$ as indicated in the sectional view of Fig. 2. Each aperture, therefore, constitutes a cylindrical wave guide channel capable of readily transmitting electromagnetic waves of wavelengths not greater than approximately $1.708d$ in accordance with the well-known principles of electromagnetic wave guide transmission. For rectangular guides having a broader dimension $a$ and transmitting waves having electric vectors perpendicular to the broad dimension the limiting wavelength is approximately $2a$. The thickness $t$ of the plate, which is the length of the individual wave guide channels, should be preferably of the order of two wavelengths. If a beam of microwaves of various frequencies be projected against the upper surface of the plate 11 so that the rays are incident upon it at an inclination to the upper face as indicated by the lines 13, energies of certain components in excess of a critical frequency, and hence of less than a corresponding critical wavelength, will be propagated through the apertures 12 serving as wave guides and will pass to the other side of the plate 11 as indicated by the rays 14. However, to components of frequencies lower than the critical cut-off frequency, that is, having wavelengths greater than the critical wavelength, the plate 11 appears electrically opaque and such components will be reflected as indicated by the rays 15. Insofar as the plate 11 approaches the ideal of unity space factor, that is, of presenting to incident waves a surface made up wholly of the ends of minute wave guides, the plate 11 will serve to divide the band of incident waves into a pass band transmitted through the plate and a reflected band reflected by the plate, the pass band and the reflected band having a common frequency limit at the cut-off frequency of the wave guides.

Figure 2:
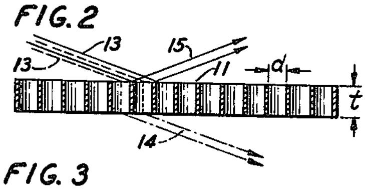
Fig. 2 is a section along the broken line 2—2 of Fig. 1.

In one example of the high-pass filter illustrated in Figs. 1 and 2 for infra-red wave separation, the thickness $t$ of the plate 11 may be about 0.3 millimeter, the width and the length of the plate may each be about 10 centimeters. The holes may be 0.004 inch in diameter. The cut-off wavelength for H1 or $TE_1$ waves (page 146, Hyper and Ultra High Frequency Engineering by Sarbacher and Edson) is approximately 0.174 millimeter.

Figure 3:
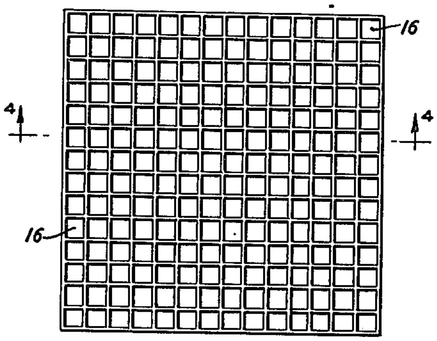
Fig. 3 is a modification of the structure of Fig. 1 in which the apertures are of rectangular cross-section.
Figure 4:
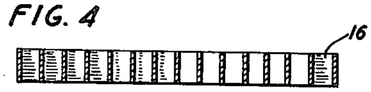
Fig. 4 is a section along the broken line 4—4 of Fig. 3.

Figs. 3 and 4 present an alternative structure to that of Figs. 1 and 2 in which the individual wave guides 16 are of rectangular cross-section. This permits an increase of the wave guide area and hence of the space factor with a consequent increase in the selective efficiency. In this example, the cut-off frequency for transversely polarized electric waves is approximately $2a$ where $a$ represents the dimension of the individual guide aperture 1 transverse to the direction of polarization.

Figure 5:
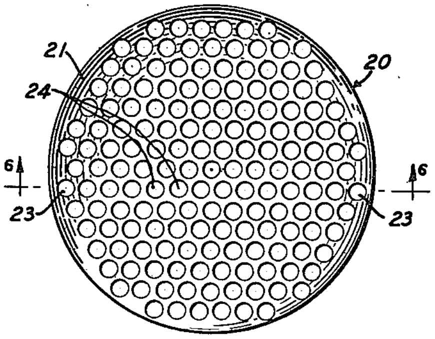
Fig. 5 shows a modification of the structure of Fig. 2 in which the apertured disk is of circular contour and both its principal faces are concave.
Figure 6:
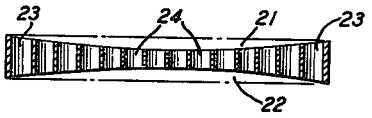
Fig. 6 is a section along the broken lines 6—6 of Fig. 5.

Fig. 5 shows a disk-shaped plate 20, the principal faces of which are concave as indicated at 21 and 22 in the sectional view, Fig. 6. The effect of this structure is to subject an incident beam of waves to a frequency selective action as in the case of the structures of Figs. 1 and 3. In addition to its frequency selective property because the outer wave guides 23 are longer than the wave guides 24 nearer the center the device serves in effect as a converging lens for the wave components of those frequencies above its cut-off frequency. It serves as a convex mirror for incident waves of those components below its cut-off frequency.

Fig. 7 illustrates a modification of the structure of Fig. 1 in which the apertures vary in diameter row by row passing from one side of the structure to the opposite side. As an example, the lowermost row may have apertures 26 with a diameter of 0.1 millimeter and the uppermost row apertures 27 having a diameter of 0.2 millimeter. If, now, radiation of a single wavelength of 0.175 millimeter is incident upon such a screen it will be propagated through the 0.1 millimeter apertures with infinite phase velocity but through the 0.2 millimeter apertures it will be transmitted with only moderate velocity. The transmitted radiation will accordingly emerge from the plate at a substantial angle from the normal as if it were passed through a prism. The rate at which successive rows of holes increases in diameter will determine the degree of refraction effected by the structure. Such a device may be used to refract a single frequency beam or it may be used in the well-known manner of prisms to spread out a spectrum of component frequencies which will be differently refracted.

Fig. 8 shows a circular disk 28 having its principal faces 29 and 30 along parallel planes as shown in the sectional view of Fig. 9. The apertures are arranged in circular configurations, the diameters of the apertures increasing from the outer periphery as at 31 towards the center as at 32. From the preceding discussion of the operation of the structure of Fig. 7 it will be apparent that a beam of microwaves of a single frequency within the transmission range of the apertures will experience high phase velocity at the periphery and considerably lower phase velocity at the center of the structure. It follows that the device will serve as a converging lens for that band of frequencies for which it is pervious. By the same token it will serve as a diverging reflector for oscillations of a frequency below the cut-off of the largest aperture.

It is possible to combine the concave characteristic of Fig. 6 with the varying diameter aperture of Fig. 8 to produce a device such as that of Fig. 10 to reduce the focal length of the wave guide lens.

Fig. 11 shows a telegraph or signaling system in which submillimeter waves from a source 33 of infra-red rays are permitted to fall in a beam upon an apertured wave guide transmission screen 35 similar to the screen of Figs. 1 and 2. A shutter plate 36 slidably supported between guides 37 and 38 is normally held in a retracted position by two springs 39 to intercept the beam from the source 33 at a point between the source and the screen 35. The shutter 36 may be controlled by operation of a solenoid core 40 integrally connected thereto and surrounded by a solenoid coil 41 in series with a source of current 42 and a signal key 43. When the key 43 is closed to transmit a light beam impulse, the solenoid core 40 retracts the shutter 36 to the position shown permitting the beam from the source 33 to impinge upon the screen 35. The screen 35 is preferably so apertured as to pass all radiation above a definite cut-off frequency. The higher frequency waves passing through the screen 35, as indicated at 44, impinge first upon an apertured wave guide prism 69 which may be identical in type with the prism of Figs. 7 and 8 and which is designed so as to permit component energies of the desired frequencies to pass on towards a concave mirror 45. The mirror 45 reflects the frequencies as a converging beam 46 which falls upon a second wave guide screen 47 having a slightly higher cut-off frequency than the filter screen 35.

The prism 69 is so designed that it differently refracts the undesired higher frequency components which it is desired to attenuate and disperses their energies outside the system as indicated by the dispersed beam 70. It also tends to act as a converging lens in one direction and may, if so desired, be designed to cause the desired energies to converge along a line focus. In the present instance the mirror 45 is placed well inside the focal distance of the prism 69 so as to permit some separation of the desired energies from the undesired energies but to avoid undue concentration of energy which might cause troublesome heating effects.

Most of the remaining higher frequency components of the beam 46 will be transmitted through the screen 47 and will be effectively eliminated. However, those components of the beam 46 which have a frequency lower than the cut-off frequency of the screen 47 will be reflected as a beam 48 upon a second converging mirror 49. By suitable design of the screens 35 and 47, their cut-off frequencies may be brought relatively close together to restrict the beam 48 to a relatively narrow range of frequencies. The mirror 49 reflects the beam 48 and causes it to fall upon a converging wave guide lens 71 which is preferably of the type disclosed in Figs. 5 and 6 although the device of Figs. 8 and 9 or that of Fig. 10 may be utilized. The beam incident upon lens 71 is focused thereby in the region of a photosensitive or thermosensitive element 50 of any well-known type positioned near the focal point of a reflecting mirror 51 which may be paraboloidal or other desired form. If a prism such as the device of Fig. 7 be substituted for the converging lens 71 to focus the energy along a line instead of at a point, it will be advantageous to use a parabolic reflector 51 instead of the paraboloidal shape and also to use a linear photosensitive element. In an electric circuit in series with the photosensitive element 50 there is a source 52 of electric current and an indicating device 53 which may be a milliammeter or any other visual or audible impulse indicator. Consequently, operation of the signal key 43 at the transmitting terminal causes operation of the receiving indicator 53 at the receiving terminal, the intermediate energy translations occurring as a result of selecting or reflecting operations on the beam of radiant energy emanating from the source 33.

Fig. 12 illustrates the application of the invention to production of contiguous frequency radiant energy bands. In this system a source 55 of submillimeter wavelength electromagnetic radiations is energized by a local electric current source 56. Surrounding the source 55 is a shield 57 which confines the radiation to a beam 58 passing through an opening of the shield and falling successively upon three wave guide filters 59, 60 and 61 which may be the type disclosed in Figs. 3 and 4. Connected to the shield 57 and surrounding the filter is a radiant energy absorbing shield 62. The screens or filters 59, 60 and 61 have respective cut-off frequencies $f_1$, $f_2$ and $f_3$. The beam 58 falling upon screen 59 will be divided into two parts. One consisting of all those components of frequency less than $f_1$ will be reflected as indicated at 63 passing out through an opening 64 in the shield 62. The remaining portion of the beam comprising component oscillations of all frequencies in excess of $f_1$ will pass through the screen 59 and impinge upon the screen 60 where it will again be divided, those components of frequency less than $f_2$ being reflected as at 65 and those of higher frequency than $f_2$ passing through the screen to impinge upon the final screen 61. The oscillations reflected by the screen 60 will therefore comprise a band extending from the frequency $f_1$, the cut-off of the filter 59, to $f_2$, the cut-off frequency of filter 60. This band of oscillations will therefore be reflected through the opening 66 in the lower portion of the shield 62. In like manner, the screen 61 which has a cut-off frequency $f_3$ somewhat higher than $f_2$ will cause a third band extending from the frequency $f_2$ to $f_3$ to be reflected through the opening 67 while all components of frequencies above $f_3$ will pass on through the lens 61 as indicated at 68. It will be seen, therefore, that it is possible to make the cut-off frequencies $f_1$, $f_2$ and $f_3$ at the respective screens as close together as may be desired by suitable design of the apertures which diminish in transverse dimension from filter to filter. Accordingly, the system of Fig. 12 may be utilized to break up submillimeter electromagnetic wave radiations into any desired number of contiguous bands, each of a width depending upon the difference of the cut-off frequencies of the contiguous pair of wave guide filters.

The systems of Figs. 11 and 12 may be combined by utilizing each of the bands of waves issuing from the outlets 64, 66 and 67 as an original source of waves for a communication channel. Accordingly the beam 65 issuing from outlet 66 may serve in lieu of the source 33 of Fig. 11. It will accordingly be understood that the disclosure of Fig. 12 is to be taken as a multiple carrier telegraph system in which the details of a single channel are as illustrated in Fig. 11 except for the details of the original source of electromagnetic waves.

The invention accordingly provides apparatus and techniques for use in the submillimeter wavelength range and of especial importance in the electromagnetic wave region designated generally by the terms "infra-red rays" and "heat rays."

What is claimed is:

1. A frequency selective transmission system for electromagnetic waves comprising a screen of electrically conducting material having closely spaced apertures of such diameter as to permit passage therethrough of waves of less than a given wavelength and a second screen upon which waves passing through the first screen may fall at an inclination to its surface, said second screen having apertures of smaller diameter to cause reflection of all waves above a second given wavelength whereby said reflected waves comprise a band having the two given wavelengths as limits.

2. A frequency selective transmission system for electromagnetic waves comprising a screen of electrically conducting material having closely spaced apertures of such diameter as to permit passage therethrough of waves of less than a given wavelength, converging means in the path of the waves passing through said screen to cause said waves to converge at a focal region of said converging means, a second apertured screen of electrically conducting material placed in the focal region with its principal plane inclined to the direction of the convergent beam, said second screen having closely spaced apertures each of a diameter smaller than the apertures of said first screen.

3. A frequency selective transmission system for electromagnetic waves comprising a source of a beam of electromagnetic waves, a first screen of electrically conducting material positioned in the path of said beam and having closely spaced apertures of such dimension as to permit passage therethrough of a portion of said incident beam of waves of less than a given wavelength, a second screen of electrically conducting material for receiving that portion of the beam of waves passing through said first screen and having closely spaced apertures of dimensions smaller than those of said first screen whereby that portion of said beam of waves incident upon and reflected by said second screen constitutes a wave band having upper and lower wavelength limits determined respectively by the dimensions of the apertures of the two screens, and a converging screen interposed between the two screens to receive that portion of said beam passed by the first screen and to focus the received portion at the face of the second screen.

GEORGE C. SOUTHWORTH.

References Cited in the file of this patent

UNITED STATES PATENTS

| Number | Name | Date |
|---|---|---|
| 1,717,360 | Anderson | June 18, 1929 |
| 2,043,347 | Clavier | June 9, 1936 |
| 2,129,712 | Southworth | Sept. 13, 1938 |
| 2,216,326 | Smith | Oct. 1, 1940 |
| 2,314,800 | Pineo | Mar. 23, 1943 |
| 2,325,765 | Gartenmeister | Aug. 3, 1943 |
| 2,415,352 | Iams | Feb. 4, 1947 |
| 2,423,648 | Hansell | July 8, 1947 |
| 2,432,093 | Fox | Dec. 9, 1947 |
| 2,442,951 | Iams | June 8, 1948 |

FOREIGN PATENTS

| Number | Country | Date |
|---|---|---|
| 439,608 | Great Britain | Dec. 10, 1935 |

OTHER REFERENCES

Metallic Delay Lenses, by W. E. Kock, January 1948, Bell System Technical Journal, vol. 27, pages 58 to 82.

Metal-Lens Antennas, by W. E. Kock, Proc. I. R. E., vol. 34, November 1946, pages 828 to 836.